United States Patent Office 3,169,963
Patented Feb. 16, 1965

3,169,963
2,4,6-TRISUBSTITUTED-s-TRIAZINES AND
PROCESS FOR PREPARING SAME
Grace A. Peters, Stamford, and Frederic C. Schaefer,
Darien, Conn., assignors to American Cyanamid Company, New York, N.Y., a corporation of Maine
No Drawing. Filed Nov. 7, 1960, Ser. No. 67,500
3 Claims. (Cl. 260—248)

This invention relates to novel 2,4,6-trisubstituted-s-triazines and to a process for preparing the same.

The 2,4,6-trisubstituted-s-triazines with which the present invention is concerned may be represented by the following structural formula:

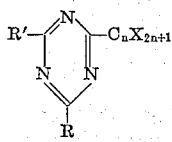

in which R is a member selected from the group consisting of alkyl and aryl radicals, R' is a member selected from the group consisting of hydrogen, alkyl and aryl radicals, X is a halogen atom selected from the group consisting of bromine, chlorine and fluorine and $n$ is a whole integer having a value from 1 to 3, inclusive. Observation of the formula as depicted hereinabove thus indicates that the compounds encompassed within the present invention are s-triazines having a single perhaloalkyl radical, e.g. tribromomethyl, trichloromethyl, trifluoromethyl, pentabromoethyl, pentachloroethyl, pentafluoroethyl, heptabromopropyl, heptachloropropyl and heptafluoropropyl, as a substituent on the triazine nucleus. The remaining substituents, i.e. R' and R, are and may be a hydrogen atom and an alkyl radical or a hydrogen atom and an aryl radical or an alkyl radical and an aryl radical. For purposes of this application the hydrogen atom is defined as a substitutent and the expression "2,4,6-trisubstituted-s-triazines" is intended to embrace not only those compounds having alkyl and aryl substituents but also those compounds having a hydrogen atom as a substituent.

Suitable alkyl substituent or substituents are unsubstituted lower alkyl radicals, i.e. those having 1 to 4 carbon atoms, for example, methyl, ethyl, propyl, isopropyl, butyl and isobutyl. Typical aryl substituent or substituents include the monocyclic aryl radicals of the phenyl series, e.g. unsubstituted phenyl and substituted phenyl including m- and p- substituents such as nitro-, chloro-, methyl-, methoxy- and the like.

Although various methods have been proposed for the preparation of tris-(trichloromethyl)-s-triazine, for example, by the trimerization of trichloroacetonitrile, and of bis(trichloromethyl)-s-triazine, for example, by the reaction of trichloroacetonitrile and acetonitrile, compounds of the formula hereinabove, as far as we are aware, are unknown. Nor are any of the known synthetic methods readily available for the preparation of such compounds.

It is therefore a principal object of the present invention to prepare novel 2,4,6-trisubstituted-s-triazines.

It is a further object to provide a novel method for the preparation of 2,4,6-trisubstituted-s-triazines in a simple and direct manner and in good yields. Other objects and advantages will become apparent from the following detailed description.

Unexpectedly, it has now been discovered that an N-(iminoacyl)-perhaloalkaneamidine may be reacted with an acylating agent so as to obtain in good yield a 2,4,6-trisubstituted-s-triazine having a single perhaloalkyl radical as a substituent on the triazine nucleus. The process of the present invention proceeds readily at room temperature or at elevated temperatures and the products are easily recoverable.

Illustratively, this reaction may be shown as:

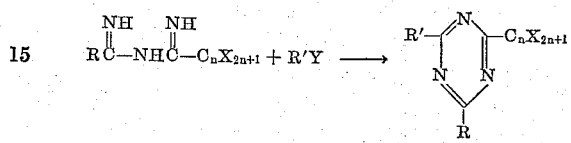

In this above depicted reaction scheme, R, X and $n$ of the N-(iminoacyl)-perhaloalkaneamidine reactant have the values as hereinabove. Similarly R' of the acylating agent has the value as hereinabove while Y possesses the grouping:

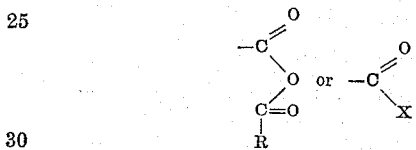

where R and X have the value as hereinabove.

Referring to the structural formula hereinabove, it will thus be seen that among the compounds which may be prepared by the process of the present invention there may be listed, non-limitatively, inter alia, the following:

2-unsubstituted-4-methyl-6-trichloromethyl-s-triazine,
2-unsubstituted-4-ethyl-6-trichloromethyl-s-triazine,
2-unsubstituted-4-propyl-6-trichloromethyl-s-triazine;
2-methyl-4-phenyl-6-tribromomethyl-s-triazine,
2-ethyl-4-phenyl-6-tribromomethyl-s-triazine,
2-phenyl-4-propyl-6-tribromomethyl-s-triazine,
2-isopropyl-4-phenyl-6-tribromomethyl-s-triazine,
2-butyl-4-phenyl-6-tribromomethyl-s-triazine,
2-isobutyl-4-phenyl-6-tribromomethyl-s-triazine and similarly substituted
6-trichloromethyl- and 6-trifluoromethyl-s-triazines;
2-methyl-4-pentachloroethyl-6-phenyl-s-triazine,
2-ethyl-4-pentachloroethyl-6-phenyl-s-triazines,
2-pentachloroethyl-4-phenyl-6-propyl-s-triazine,
2-isopropyl-4-pentachloroethyl-6-phenyl-s-triazine,
2-butyl-4-pentachloroethyl-6-phenyl-s-triazine,
2-isobutyl-4-pentachloroethyl-6-phenyl-s-triazine,
and similarly substituted pentabromoethyl and pentafluoroethyl-s-triazines;
2-heptafluoropropyl-4-methyl-6-phenyl-s-triazine,
2-ethyl-4-heptafluoropropyl-6-phenyl-s-triazine,
2-heptafluoropropyl-4-phenyl-6-propyl-s-triazine,
2-heptafluoropropyl-4-isopropyl-6-phenyl-s-triazine,
2-butyl-4-heptafluoropropyl-6-phenyl-s-triazine,
2-heptafluoropropyl-4-isobutyl-6-phenyl-s-triazine and similarly substituted heptabromopropyl and heptachloropropyl-s-triazines;
2-methyl-4-tolyl-6-tribromomethyl-s-triazine, 2-methyl-4-tolyl-6-trichloromethyl-s-triazine,
2-methyl-4-tolyl-6-trifluoromethyl-s-triazine;
2-unsubstituted-4-chlorophenyl-6-trichloromethyl-s-triazine,
2-methyl-4-nitrophenyl-6-trichloromethyl-s-triazine, etc.

An examination of the above listed compounds indicates that not every one of the possible compounds is named specifically. Nevertheless, it is intended to cover all these compounds as well as others covered by the general formula but not specifically named. The proportions of the reactants, as indicated in the above equation, are equimolar. However, an excess of either reactant may be used without adversely affecting the overall yield. However, it is usually desirable to employ an excess of the acylating agent.

The N-(iminoacyl) perhaloalkaneamidine and acylating agent may be reacted to yield the 2,4,6-trisubstituted-s-triazine simply by heating the reactants usually at the reflux temperature of the reaction mixture or in some cases even without heat. In most instances, the temperature range of the reaction is from about 25° to about 150° C., and preferably in the range of 50°–120° C. Following an appropriate period for reaction, usually one-half hour to three hours, the reaction mixture is cooled and diluted with water. Separation of the 2,4,6-trisubstituted-s-triazine product is then achieved by conventional methods such as crystallization, distillation or the like. Although a solvent is not necessary in most cases, it may be desirable to employ a solvent in some cases to moderate the initial exothermic phase of the reaction. Among the preferred solvents are chloroform, benzene, dioxane, carbon tetrachloride and other inert solvents.

Any of a large variety of N-(iminoacyl)perhaloalkaneamidines having the grouping:

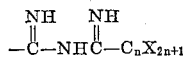

may be employed in the process of this invention. These starting materials may be prepared by the reaction of an amidine with a perhalonitrile according to the procedure of Backer and Wanmaker, Rec. trav. chim. 70, 644 (1951).

By the term "acylating agent" as it is used herein is meant an acid anhydride or an acid halide. Among the suitable acid anhydrides and acid halides which may be employed in the process of the present invention there may be mentioned formic acetic anhydride, acetic anhydride, propionic anhydride, acetyl chloride, propionyl chloride, butyryl chloride, benzoyl chloride and monocyclic aroyl chlorides having as typical substituents chloro-, nitro-, methyl- and methoxy-radicals. While the acid chlorides because of their ready availability are usually employed, other acid halides such as the acid fluorides and acid bromides may be similarly used.

Since the process of the present invention is one wherein a 2-alkyl-4-aryl-6-perhaloalkyl-s-triazine may be prepared, it will be appreciated that as to the aryl substituent this may be derived from the N-(iminoacyl)perhaloalkaneamidine or the acid anhydride or acid halide. Similarly, the lower alkyl substituent may be derived from the N-(iminoacyl)perhaloalkaneamidine reactant or the acid anhydride or acid halide. For the preparation of trisubstituted-s-triazines wherein a hydrogen atom is present on the triazine nucleus, formic acetic anhydride is generally preferred. In most cases, the choice will be dependent upon the accessibility of the starting materials. In any event, however, the reaction proceeds smoothly.

As a class, 2,4,6-trisubstituted-s-triazines having a perhaloalkyl substituent exhibit insecticidal activity to a greater or lesser degree. Moreover, specific members of the class also have demonstrated herbicidal activity.

In order to further illustrate the present invention but not in any way to limit it thereto, the following examples are given.

EXAMPLE 1

*Preparation of N-(acetimidyl)trichloroacetamidine*

A solution of acetamidine is prepared from 28.5 grams (0.3 mole) of the amidine hydrochloride by treatment with a solution of 12 grams (0.3 mole) of NaOH in 120 cc. of methanol. Trichloroacetonitrile (43.0 grams or 0.3 mole) is added dropwise at 15–20° C. to the acetamidine solution. The mixture is allowed to stand overnight and is concentrated under reduced pressure to substantial crystallization. A crop of 22.8 grams of the product is obtained by filtration and an additional 11.8 grams is obtained by extraction of the completely stripped residue with hexane for a total of 34.7 grams (57%). Recrystallized material forms shiny plates, M.P. 92–4° C.

EXAMPLE 2

*Preparation of N-(benzimidyl)trichloroacetamidine*

A solution of 0.1 mole benzamidine is prepared by adding 15.6 grams of the amidine hydrochloride to a solution of 4 grams (0.1 mole) of NaOH in 50 cc. of methanol, stirring for half an hour and filtering the precipitated NaCl. To the thus prepared solution, 14.5 grams (0.1 mole) of trichloroacetonitrile is added dropwise at 15–20° C. Following an additional hour of stirring, 4 grams of product is filtered and then recrystallized from heptane to a constant melting point of 69–70° C. The mother liquor is concentrated under reduced pressure to a syrup and extracted with additional heptane to obtain 4 grams of product (30% total).

EXAMPLE 3

*Preparation of N-(trifluoroacetimidyl)benzamidine*

Trifluoroacetonitrile (13 grams, 0.13 mole) is absorbed in a cold solution of 0.19 mole of benzamidine in 15 cc. of acetonitrile which is stirred under a dry ice-acetone condenser and protected from moisture by a calcium chloride drying tube. The reaction mixture is then allowed to reflux gently for 1.5 hours during which time the temperature rises to about 25° C. and until the boiling becomes insignificant. It is then allowed to stand at room temperature for 4 days. The product solution is filtered and evaporated. The residue is taken up in ether, refiltered and re-evaporated to yield N-(trifluoroacetimidyl)benzamidine.

EXAMPLE 4

*Preparation of 2,4-dimethyl-6-trichloromethyl-s-triazine*

A mixture of 2.0 grams of N-(acetimidyl)trichloroacetamidine, as prepared in Example 1 and 10 cc. of acetic anhydride is refluxed for a period of one hour to obtain a homogeneous brown solution. Upon cooling, the mixture is pured onto ice water. The product precipitates as a brown powder weighing 2.0 grams (89%). The product, which is soluble in alcohols, ether, benzene and acetonitrile, is recrystallized to a constant melting point, 69–71° C., from aqueous acetonitrile. The product had the following elementary analysis: Calculated for $C_6H_6N_3Cl_3$: C, 31.81, H, 2.67, N, 18.55; Found: C, 31.95, H, 2.79, N, 18.65.

EXAMPLE 5

*Preparation of 2-methyl-4-phenyl-6-trichloromethyl-s-triazine*

(A) *From N-(benzimidyl)trichloroacetmaidine*

A mixture of 1.8 grams (0.0068 mole) of N-(benzimidyl) trichloroacetamidine, as prepared in Example 2, and 5 cc. of acetic anhydride is refluxed for one-half hour, cooled, and poured into ice water to obtain 2.4 parts of yellow solid, M.P. 117–120° C. Successive recrystallization from ethanol affords a yield of 1.4 grams (72%) of constant melting material, M.P. 125–126° C.

Elementary analysis of the product is as follows: Calculated for $N_3Cl_2C_{11}H_{18}$: C, 45.78, H, 2.79; Found: C, 46.66, H, 3.01.

(B) *From N-(acetimidyl)trichloroacetamidine*

One gram (0.005 mole) of the amidine as obtained in Example 1 is added to 1 cc. of benzoyl chloride in 20 cc. of benzene and the mixture is refluxed one-half hour. A white solid, 0.5 grams, M.P. 168–173° C. is filtered and the filtrate is washed in turn with 2% aqueous sodium carbonate, hydrochloric acid and water, then dried and stripped of solvent to leave a residue of 0.5 grams of the product triazine, M.P. 110–115° C. Recrystallization raises the melting point to 120–124° C. Infrared comparison with the previously prepared sample indicates that the two products are identical.

EXAMPLE 6

*Preparation of 2-methyl-4-phenyl-6-trifluoromethyl-s-triazine*

The crude product (N-trifluoroacetimidyl) benzamidine, as obtained in Example 3, is mixed with 30 cc. of acetic anhydride and heated at reflux for 1.5 hours. After cooling, the reaction product is diluted with ice water and neutralized with potassium carbonate under ether. The ether layer is then dried and evaporated, yielding a crystalline residue. Recrystallization from methanol and from hexane affords 12 grams of 2-methyl-4-phenyl-6-trifluoromethyl-s-triazine, M.P. 61–62° C.

EXAMPLE 7

*Preparation of 2-heptafluoropropyl-4-methyl-6-phenyl-s-triazine*

N-(heptafluorobutyrimidyl) benzamidine is prepared by the reaction of heptafluorobutyronitrile with benzamidine in acetonitrile. Reaction of the crude syrup with acetic anhydride for 3 hours at reflux, followed by the work-up procedure described for the trifluoro analogue of Example 6 affords a 32% yield of product, M.P. 45–46° C. (from methanol). Elementary analysis of the product is as follows: Calculated for $C_{13}H_8N_3F_7$: C, 46.03, H, 2.38, N, 12.39. Found: C, 45.70, H, 2.52, N, 12.12.

EXAMPLE 8

Herbicidal properties of the compounds prepared in Examples 4 and 5, 2,4 - dimethyl - 6 - trichloromethyl - s-triazine and 2-methyl-4-phenyl-6-trichloromethyl - s - triazine were investigated and the results of such investigations indicate the utility of the compounds of the present invention. Thus, when a 0.1 percent dispersion in water of each of the compounds prepared in Examples 4 and 5 was applied to wheat seeds and radish seeds, the following percentage kill was obtained:

| | | Percent Kill | |
|---|---|---|---|
| | | Wheat Seeds | Radish Seeds |
| $CH_3$—⟨triazine with $CCl_3$⟩—$CH_3$ | 0.1% | 92 | 82 |
| ⟨phenyl⟩—⟨triazine with $CCl_3$⟩—$CH_3$ | 0.1% | 84 | |

Obviously, the order compounds of the present invention possess similar herbicidal activity to a greater or lesser degree. Consequently, the test results hereinabove tabulated are not to be construed as a limitation of the utility of the compounds of the present invention.

We claim:
1. 2-methyl-4-phenyl-6-trifloromethyl-s-triazine.
2. 2-heptafluoropropyl-4-methyl-6-phenyl-s-triazine.
3. 2-ethyl-4-phenyl-6-trifluoromethyl-s-triazine.

References Cited in the file of this patent

UNITED STATES PATENTS

| 2,671,085 | Grundmann et al. | Mar. 2, 1954 |
| 3,038,900 | Dess | June 12, 1962 |

OTHER REFERENCES

Shriner et al.: Chemical Reviews, vol. 35, pages 407 and 420 (1944).

Houben Weyl: "Methoden der Organischen Chemie," Band XI/2, page 38, George Thieme Verlag, Stuttgart, Germany (1958).

Grundmann et al.: Annalen der Chemie, vol. 577, pages 77 to 91 (1952).

Schaefer et al.: Journ. of the Am. Chem. Soc., vol. 81, pages 1472–3 (Mar. 20, 1959).

Reinhardt et al.: Chemische Berichte, vol. 90, pages 2643–45 (1957).

Smolin et al.: "s-Triazines and Derivatives," pages 157 to 158, Interscience Publishers Inc., New York (February 1959).

UNITED STATES PATENT OFFICE
CERTIFICATE OF CORRECTION

Patent No. 3,169,963　　　　　　　　　　　　February 16, 1965

Grace A. Peters et al.

It is hereby certified that error appears in the above numbered patent requiring correction and that the said Letters Patent should read as corrected below.

Column 5, line 3, for "46.66" read -- 45.66 --; column 6, in the table, under the heading "Radish Seeds", and opposite the last entry, insert -- 74 --; same column 6, line 22, for "order" read -- other --.

Signed and sealed this 13th day of July 1965.

(SEAL)
Attest:

ERNEST W. SWIDER
Attesting Officer

EDWARD J. BRENNER
Commissioner of Patents